(12) United States Patent
Slattery et al.

(10) Patent No.: US 11,067,101 B2
(45) Date of Patent: Jul. 20, 2021

(54) HYDRAULIC CONTROL VALVE CONFIGURED TO USE A PILOT SIGNAL AS A SUBSTITUTE LOAD-SENSE SIGNAL

(71) Applicant: Parker-Hannifin Corporation, Cleveland, OH (US)

(72) Inventors: Brian Slattery, Hicksville, OH (US); Micheal E. Harman, Bryan, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/767,181

(22) PCT Filed: Feb. 11, 2019

(86) PCT No.: PCT/US2019/017452
§ 371 (c)(1),
(2) Date: May 27, 2020

(87) PCT Pub. No.: WO2019/157429
PCT Pub. Date: Aug. 15, 2019

(65) Prior Publication Data
US 2020/0386245 A1 Dec. 10, 2020

Related U.S. Application Data

(60) Provisional application No. 62/629,444, filed on Feb. 12, 2018.

(51) Int. Cl.
*F15B 11/16* (2006.01)
*G05D 16/10* (2006.01)
(Continued)

(52) U.S. Cl.
CPC .......... *F15B 11/165* (2013.01); *E02F 9/2225* (2013.01); *F15B 13/02* (2013.01);
(Continued)

(58) Field of Classification Search
CPC . F15B 11/165; F15B 2211/355; F15B 11/167; F15B 2211/20553
See application file for complete search history.

(56) References Cited

U.S. PATENT DOCUMENTS 4,154,262 A   5/1979   Blume
5,791,142 A * 8/1998   Layne .................... F15B 11/168
                                                              60/450
(Continued)

FOREIGN PATENT DOCUMENTS

EP   2 949 948      12/2015
GB   2271625        7/1996
JP   2014 228101    12/2014

OTHER PUBLICATIONS

International Search Report and Written Opinion prepared by the European Patent Office in International Application No. PCT/US2019/017452 dated Apr. 25, 2019.

*Primary Examiner* — Thomas E Lazo
(74) *Attorney, Agent, or Firm* — McDonnell Boehnen Hulbert & Berghoff LLP

(57) ABSTRACT

An example valve assembly is configured: generate a valve load-sense pressure signal indicative of a pressure level at a workport of an actuator; generate a pilot fluid signal to be communicated to a worksection of a valve assembly to enable shifting a spool in the worksection; compare a first pressure level of the valve load-sense pressure signal to a second pressure level of the pilot fluid signal; and communicate the pilot fluid signal to a load-sense port fluidly coupled to a load-sensing source of pressurized fluid when the second pressure level of the pilot fluid signal exceeds the first pressure level of the valve load-sense pressure signal.

20 Claims, 8 Drawing Sheets

(51) Int. Cl.
  *G05D 16/04* (2006.01)
  *E02F 9/22* (2006.01)
  *F15B 13/02* (2006.01)
  *F15B 13/042* (2006.01)

(52) U.S. Cl.
  CPC ..... *F15B 13/0426* (2013.01); *G05D 16/0404* (2019.01); *G05D 16/101* (2019.01)

(56) References Cited

U.S. PATENT DOCUMENTS

| | | | | |
|---|---|---|---|---|
| 5,806,312 | A * | 9/1998 | Kauss | E02F 9/2232 |
| | | | | 137/596 |
| 7,287,375 | B2 * | 10/2007 | Goto | B66F 9/22 |
| | | | | 60/468 |
| 7,487,707 | B2 * | 2/2009 | Pfaff | F15B 11/003 |
| | | | | 91/437 |
| 7,818,966 | B2 * | 10/2010 | Pack | F15B 11/168 |
| | | | | 60/422 |
| 9,091,281 | B2 * | 7/2015 | Quinnell | E02F 9/2282 |
| 9,382,923 | B2 | 7/2016 | Carlin et al. | |
| 9,429,175 | B2 * | 8/2016 | Coolidge | F15B 11/165 |
| 2015/0101676 | A1 * | 4/2015 | Knapper | F15B 13/0417 |
| | | | | 137/102 |
| 2017/0328380 | A1 | 11/2017 | Coolidge et al. | |

\* cited by examiner

HYDRAULIC CONTROL VALVE CONFIGURED TO USE A PILOT SIGNAL AS A SUBSTITUTE LOAD-SENSE SIGNAL

CROSS REFERENCE TO RELATED APPLICATION

The present application claims priority to U.S. Provisional Application No. 62/629,444, filed on Feb. 12, 2018, which is hereby incorporated by reference in its entirety.

BACKGROUND

A hydraulic machine may have several hydraulic actuators configured to enable the machine to perform primary or main functions. For example, a wheel loader may have a hydraulic actuator configured to control movement of a bucket, with the bucket being supported by a boom structure (e.g., two arms coupling the bucket to the chassis of the wheel loader). Motion of the boom structure is enabled by one or more hydraulic actuators as well. Moving the boom structure and the bucket can be referred to as main or primary functions of the wheel loader.

The hydraulic machinery (e.g., the wheel loader) may include a hydraulic system configured to control fluid flow to the hydraulic actuators. Particularly, the hydraulic system may include a pump configured to provide flow at a particular pressure level to the hydraulic actuators through a valve to cause the hydraulic actuators to move. When the hydraulic actuators associated with the primary functions of the hydraulic machine are commanded to move, the pump raises pressure level of its output fluid to enable the hydraulic actuators to move. To save energy, however, the pump is configured to reduce the pressure level of its output fluid to a minimal standby level when the primary functions of the hydraulic machine are not commanded to move.

In examples, the hydraulic machine may have auxiliary or secondary functions in addition to the primary functions. For instance, a wheel loader may have a differential-lock function and a pin-disconnect function both of which are actuatable by a hydraulic fluid having a particular pressure level. As mentioned above, when the primary functions are not actuated, the pump reduces the pressure level of its output fluid, and therefore the pump might not be able to drive the secondary functions.

Therefore, it may be desirable to have a hydraulic system that enables the pump to provide pressurized fluid at a particular pressure level, even when primary functions of the hydraulic machine are not actuated, so as to enable operation of the secondary functions. It is with respect to these and other considerations that the disclosure made herein is presented.

SUMMARY

The present disclosure describes implementations that relate to a hydraulic control valve configured to use a pilot signal as a substitute load-sense signal. In a first example implementation, the present disclosure describes a valve assembly. The valve assembly includes: (i) an inlet section configured to receive pressurized fluid from a load-sensing source of pressurized fluid; (ii) a load-sense port configured to be fluidly coupled to the load-sensing source to provide a pressure signal to the load-sensing source, where pressure level of pressurized fluid of the load-sensing source is based on the pressure signal; (iii) at least one worksection configured to control fluid flow to and from an actuator, where the at least one worksection includes a body defining a bore and a spool axially movable in the bore; (iv) a load-sense passage traversing the at least one worksection and configured to communicate a load-sense pressure signal having a first pressure level and representing a load-induced pressure of the actuator; (v) a plurality of pilot fluid passages configured to communicate a pilot fluid signal having a second pressure level to the at least one worksection so as to move the spool in the bore; and (vi) a valve configured to: (a) receive the pilot fluid signal, and (b) in response to the second pressure level of the pilot fluid signal being higher than the first pressure level of the load-sense pressure signal, provide the pilot fluid signal to the load-sense port as the pressure signal to be provided to the load-sensing source.

In a second example implementation, the present disclosure describes a hydraulic system. The hydraulic system includes: (i) a load-sensing pump having a pump load-sense port configured to receive a pressure signal, where the load-sensing pump is configured to generate pressurized fluid having a pressure level based on the pressure signal; (ii) an actuator; and a valve assembly configured to control fluid flow from the load-sensing pump to the actuator. The valve assembly includes: (i) an inlet section configured to receive pressurized fluid from the load-sensing pump; (ii) a valve load-sense port configured to be fluidly coupled to the pump load-sense port to provide the pressure signal to the load-sensing pump; (iii) at least one worksection comprising: (i) a body defining a bore, and (ii) a spool axially movable in the bore to control fluid flow to and from the actuator; (iv) a load-sense passage traversing the at least one worksection and configured to communicate a load-sense pressure signal having a first pressure level and representing a load-induced pressure of the actuator; (v) a plurality of pilot fluid passages configured to communicate a pilot fluid signal having a second pressure level to the at least one worksection so as to move the spool in the bore; and (vi) a valve configured to: (a) receive the pilot fluid signal, and (b) in response to the second pressure level of the pilot fluid signal being higher than the first pressure level of the load-sense pressure signal, provide the pilot fluid signal to the valve load-sense port to be communicated to the pump load-sense port as the pressure signal.

In a third example implementation, the present disclosure describes a method. The method includes: (i) generating a valve load-sense pressure signal indicative of a pressure level at a workport of an actuator; (ii) generating a pilot fluid signal to be communicated to a worksection of a valve assembly, such that when a pilot valve disposed at an end of a spool in the worksection is actuated, the pilot fluid signal is communicated to the end of the spool causing the spool to shift; (iii) comparing a first pressure level of the valve load-sense pressure signal to a second pressure level of the pilot fluid signal; and (iv) communicating the pilot fluid signal to a load-sense port fluidly coupled to a load-sensing source of pressurized fluid when the second pressure level of the pilot fluid signal exceeds the first pressure level of the valve load-sense pressure signal.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
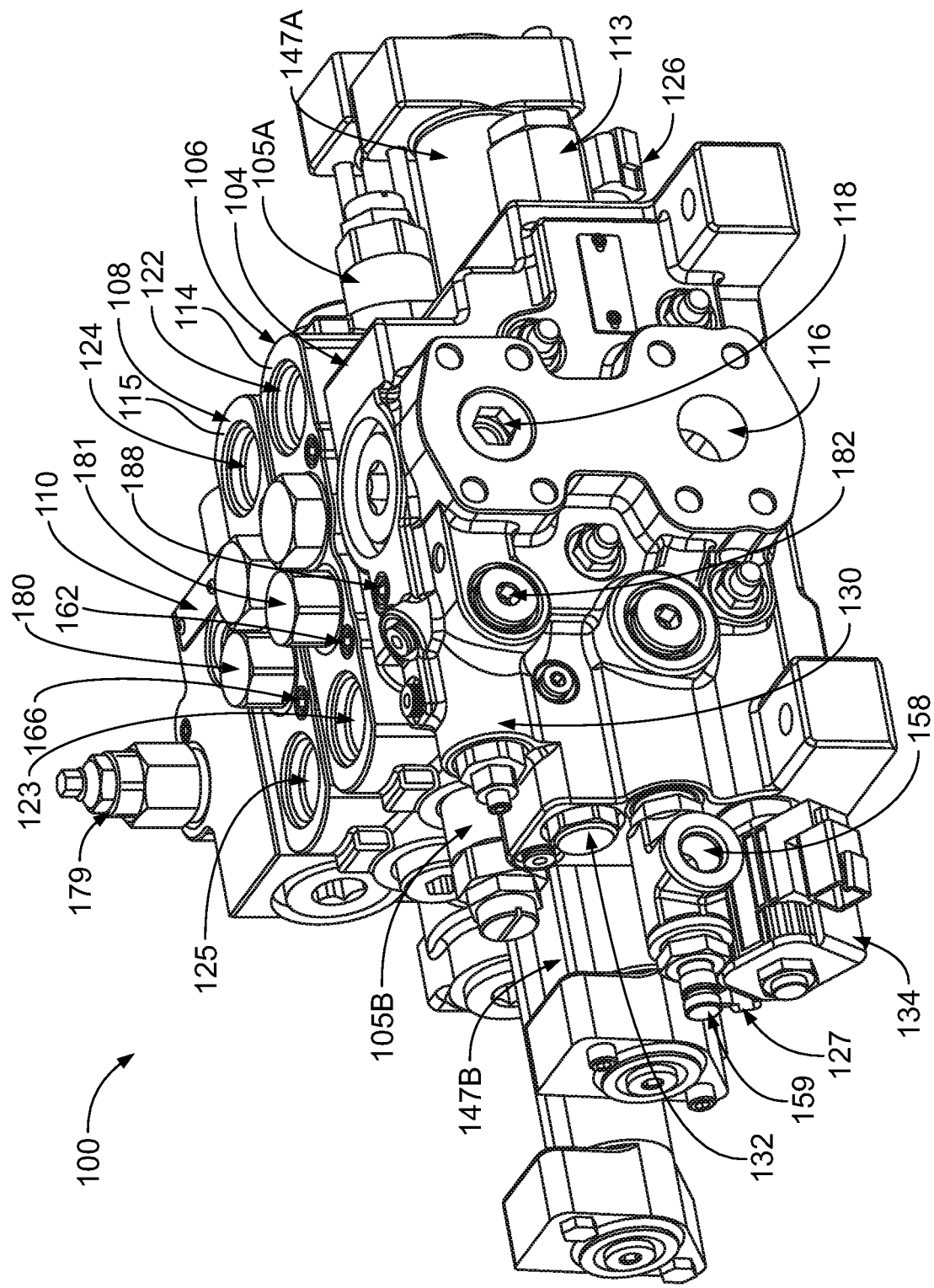
FIG. 1 illustrates a valve assembly, in accordance with an example implementation.

In certain applications, hydraulic fluid flow in a hydraulic machine can be controlled using hydraulic sectional control valves. A sectional control valve or valve assembly can include a plurality of separate cast and machined metal valve worksections. Each worksection may include internal fluid passages, external ports, and valve bores with valve members slidably disposed within each valve bore. The valve bores may include a main control valve spool bore in which a main directional control valve spool is slidably disposed. Each worksection may be configured to control flow of fluid to and from a hydraulic actuator of the hydraulic machine.

Worksections may include load-sense passages. When a spool of worksection is actuated to provide pressurized fluid to a hydraulic actuator, the load-sense passages may be fluidly connected to a workport fluidly coupled to the hydraulic actuator. Thus, the load-sense passages provide or transmit a pressure feedback signal from the workport, and the pressure feedback signal may indicate the load on the hydraulic actuator. As such, the pressure feedback signal may be referred to as a load-sense pressure signal. The load-sense pressure signal indicates the fluid pressure required to drive the hydraulic actuator.

The load-sense pressure signal may further be operably communicated to a load-sensing source of pressurized fluid. An example load-sensing source of pressurized fluid includes a load-sensing variable displacement pump. The load-sensing source is configured to provide enough fluid flow at a pressure level that is equal to the pressure level of the load-sense pressure signal plus a margin pressure value. For example, if a pressure level of the load-sense pressure signal is 2000 pounds per square inch (psi), the load-sensing source may provide fluid flow at a pressure level of 2000 psi plus a margin pressure value (e.g., 200 psi), and thus the fluid may have a pressure of about 2200 psi. This flow is communicated via plumbing to the sectional control valve, and then from the sectional control valve to the hydraulic actuator.

When the hydraulic actuator is not commanded to move, the spool of the associated worksection is not actuated, and the load-sense passages might not be fluidly coupled to the workports. In this case, the load-sensing source might not receive a load-sense pressure signal. As a result, the load-sensing source may operate in a standby mode of operation where minimal fluid flow is provided at a low pressure level, e.g., at the margin pressure value of 200-300 psi.

The hydraulic machine may include other secondary functions operable by pressurized fluid, but not controlled by the sectional control valve. The secondary functions may be fluidly coupled to the load-sensing source and may require pressurized fluid having an elevated pressure level to be operated. As an example for illustration, a secondary function of a hydraulic machine may be operated by pressurized fluid having about 400-500 psi. In examples, it may be desirable to operate the secondary functions when the primary functions controlled by the sectional control valve are not actuated. Therefore, it may be desirable to cause the load-sensing source to have a higher standby pressure level to enable operation of the secondary functions when the primary functions are not actuated.

Disclosed herein are hydraulic systems, valve sections, and valve assemblies that, among other features, provide a substitute load-sense pressure signal to the load-sensing source when the primary functions are not actuated or when the load-sense pressure signal from the primary functions is below a threshold value. This way, the load-sensing source maintains providing a high standby pressure that enables operation of the secondary functions when desired.

Figure 2:
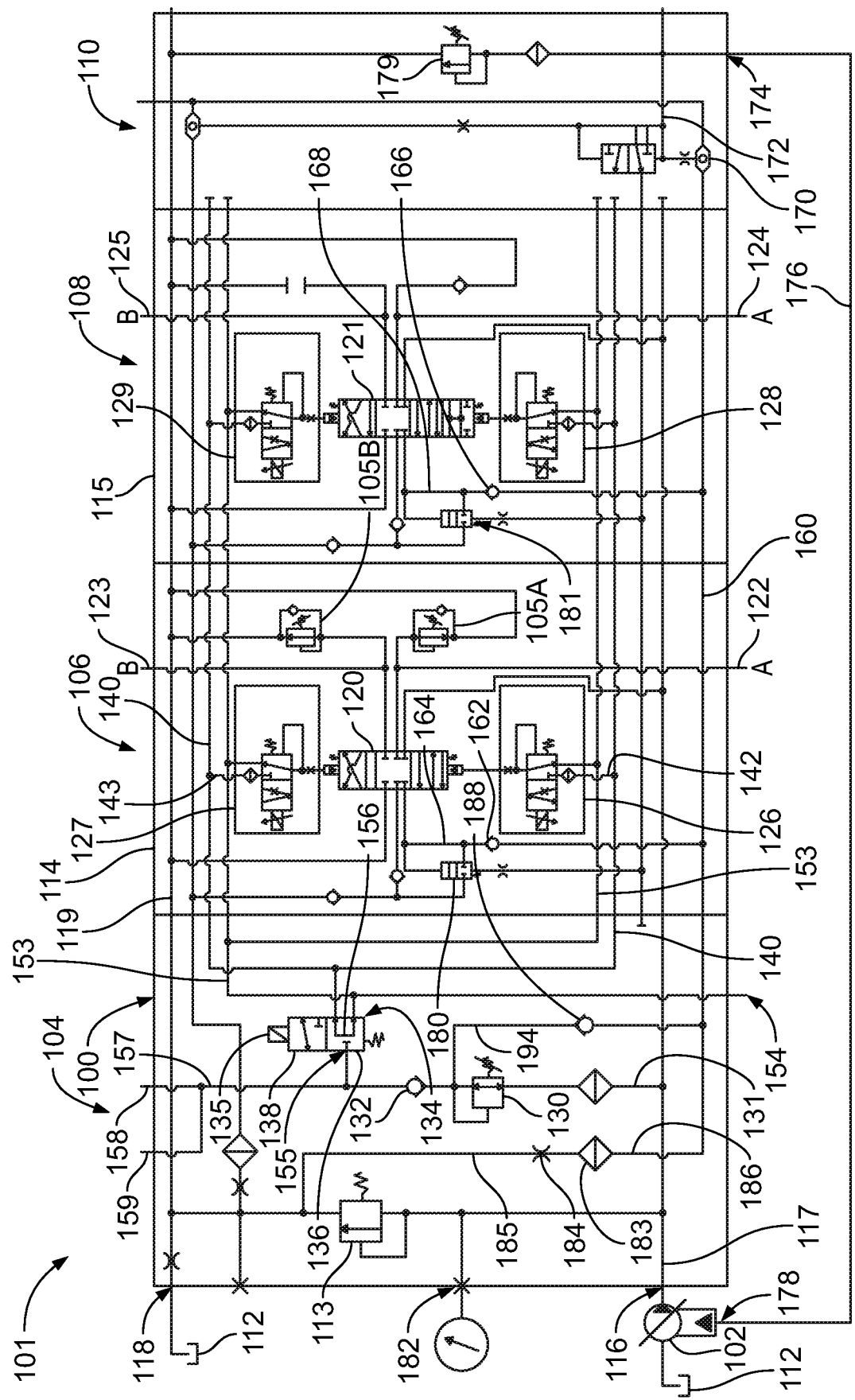
FIG. 2 illustrates a schematic of a hydraulic system that includes the valve assembly of FIG. 1, in accordance with an example implementation.

FIG. 1 illustrates a valve assembly 100, and FIG. 2 illustrates a schematic of a hydraulic system 101 that includes the valve assembly 100, in accordance with an example implementation. FIGS. 1 and 2 are described together.

The hydraulic system 101 includes a pump 102 that operates as a load-sensing source of pressurized hydraulic fluid. The pump 102 may be, for example, a load-sensing variable-displacement pump.

The valve assembly 100 has an inlet section 104, a worksection 106, another worksection 108, and an outlet section 110. The illustrated hydraulic system 101 is provided for illustration purposes, an in other examples, more or fewer worksections could be used.

Figure 5:
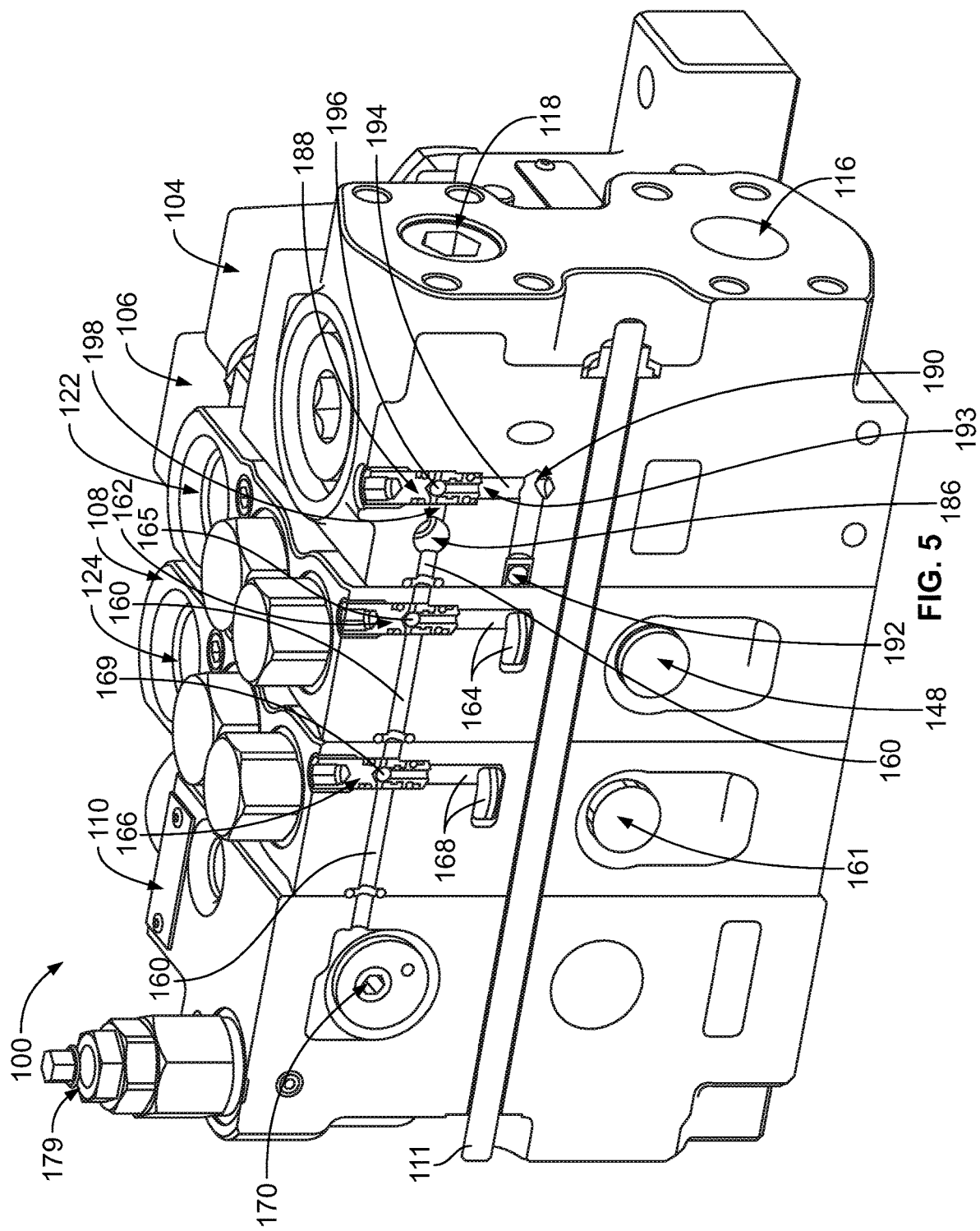
FIG. 5 illustrates a perspective view of a cross section of the valve assembly shown in FIG. 1, in accordance with an example implementation.

The inlet section 104, the worksections, 106, 108, and the outlet section 110 may be coupled together by fasteners (e.g., bolts screws, clamps, tie rods such as tie rod 111 shown in FIG. 5, etc.) to provide an assembly of valve sections. For example, the worksections 106 and 108 may be positioned adjacent one another between the inlet section 104 and the outlet section 110 of the valve assembly 100. The outlet section 110 may receive fluid from any of the inlet section 104, the worksection 106, and/or the worksection 108.

As shown in FIG. 2, the pump 102 may receive fluid from a reservoir or tank 112 to provide pressurized fluid to the valve assembly 100. The valve assembly 100, and particularly, the inlet section 104, may include a main pressure relief valve 113 to protect components of the hydraulic system 101 from elevated pressure levels that exceed a particular threshold pressure level (e.g., 5000 psi). If a pressure level of the fluid in the hydraulic system 101 exceeds the threshold pressure level, the main pressure relief valve 113 opens a fluid path from the pump 102 to the tank 112.

The worksections 106 and 108 may be similar to each other. However, in other examples, one or more of the worksections 106, 108 may be different from one another. As shown in FIGS. 1 and 2, the worksection 106 has a valve section body 114 and the worksection 108 has a valve section body 115. The valve section body 114, 115 are shown schematically in FIG. 2 as envelope border.

The pump 102 is fluidly coupled to an inlet port 116 disposed in the inlet section 104 of the valve assembly 100 such that output fluid flow from the pump 102 is received at the inlet port 116. The output fluid flow of the pump 102 is then provided to the valve sections of the valve assembly 100 via inlet flow passage 117.

The tank 112 is fluidly coupled to a tank port 118 also disposed in the inlet section 104 of in the valve assembly 100. Fluid may be allowed to return to the tank 112 from the valve sections of the valve assembly 100 via a tank flow passage 119 and through the tank port 118.

As shown in FIG. 1, the tank port 118 and the inlet port 116 are vertically-stacked in different planes. Particularly, in the example implementation shown in FIG. 1, the tank port 118 is disposed vertically above the inlet port 116 in the inlet section 104 of the valve assembly 100. This configuration can be beneficial if the valve assembly 100 is used, for example, to control an articulated hydraulic machine or vehicle, e.g., an articulated wheel loader. An articulated vehicle is a vehicle that is formed as two separate pieces. The two separate pieces are joined at a central point, and the articulated vehicle swivels at the central point. This configuration enables the articulated vehicle to maneuver in tight spaces. When the articulated vehicle swivels, however, hoses and hydraulic lines that communicate fluid to and from a valve assembly controlling operation of the articulated vehicle may rub against each other and damage may occur. The configuration of the valve assembly 100 shown in FIG. 1 can preclude such damage from occurring. Particularly, the valve assembly 100 may be disposed at a central location of the articulated vehicle. Further, the vertical stacking of the tank port 118 and the inlet port 116 causes a hose or hydraulic line that connects the pump 102 to the inlet port 116 to be disposed in a plane that is different from a respective plane of a hose or hydraulic line that connects the tank port 118 to the tank 112. As a result, the hoses do not rub against each other when the articulated vehicle swivels and damage thereto may be precluded.

Referring to FIG. 2, the worksection 106 includes a main control valve 120 and the worksection 108 includes a main control valve 121. The worksection 106 further includes a first workport 122 (A port) and a second workport 123 (B port), and similarly the worksection 108 includes a first workport 124 (A port) and a second workport 125 (B port). The main control valves 120 is configured to control fluid flow and pressure from the inlet flow passage 117 to the workports 122, 123, whereas the main control valves 121 is configured to control fluid flow and pressure from the inlet flow passage 117 to the workports 124, and 125. The worksections 106, 108 are thus configured to control flow to and from primary functions of the hydraulic machine controlled by the hydraulic system 101. As an example for illustration, if the hydraulic machine is a wheel loader, the worksection 106 can be configured to control the hydraulic cylinder configured to move the bucket, and the worksection 108 can be configured to control the hydraulic cylinders configured to move the boom. The valve assembly 100 may include workport relief valves to protect the hydraulic actuators from high pressure levels. For example, the worksection 106 may include a first workport relief valve 105A to protect the workport 122 and a second workport relief valve 105B to protect the workport 123.

Each of the main control valve 120, 121 may include a respective spool. The spool can be actuated in either direction via various types of mechanisms. As an example for illustration, pilot valves 126, 127 are solenoid-operated and could be used to actuate or move the spool in a spool bore disposed with the worksection 106, whereas pilot valves 128, 129 are solenoid-operated and could be used to actuate or move the spool in a spool bore disposed with the worksection 108. However, other configurations of pilot valves that are manually, hydraulically, or pneumatically actuated could be used. The pilot valves 126-129 are depicted and described herein as solenoid-operated as an example for illustration only.

The pilot valves 126-129 are configured to receive a pilot fluid signal, such that when a pilot valve of the pilot valves 126-129 is actuated by an electric signal, the actuated pilot valve provides the pilot fluid signal or enables communication of the pilot fluid signal to an end cap disposed at a respective end of the spool. The fluid in the end cap applies a force on the spool in a respective axial direction causing the spool to shift in the spool bore.

To provide the pilot fluid signal to the pilot valves 126-129, the inlet section 104 of the valve assembly 100 includes a pressure reducing valve 130 that is fluidly coupled to the inlet flow passage 117 via a hydraulic passage 131 as schematically depicted in FIG. 2. The pressure reducing valve 130 is configured to receive the pressurized fluid provided by the pump 102 and generate the pilot fluid signal for the pilot valves 126-129. Particularly, the pressure reducing valve 130 is configured to reduce pressure level of the pressurized fluid provided by the pump 102 (which could have a high pressure level such as 4000 psi) to a particular lower pressure level, such as 600 psi. Other techniques could be used to generate the pilot fluid signal. For example, the pilot fluid signal could be provided externally to the valve assembly 100 through a particular port in one of the valve sections (e.g., the inlet section 104). In another example, the pilot fluid signal could be provided from the pump 102 or from another pump configured to generate the pilot fluid signal. Generating the pilot fluid signal by the pressure reducing valve 130 is used herein as an example for illustration.

The pilot fluid signal generated by the pressure reducing valve 130 then flows through a check valve 132 and is provided to a pilot-enable valve 134 disposed in the inlet section 104. The pilot-enable valve 134 is actuatable by a solenoid 135. When the pilot-enable valve 134 is unactuated (e.g., no electric signal is provided to the solenoid 135), the pilot-enable valve 134 operates in a pilot-disable state 136. When the pilot-enable valve 134 is actuated (e.g., an electric signal is provided to the solenoid 135), the pilot-enable valve 134 operates in a pilot-enable state 138.

Figure 3:
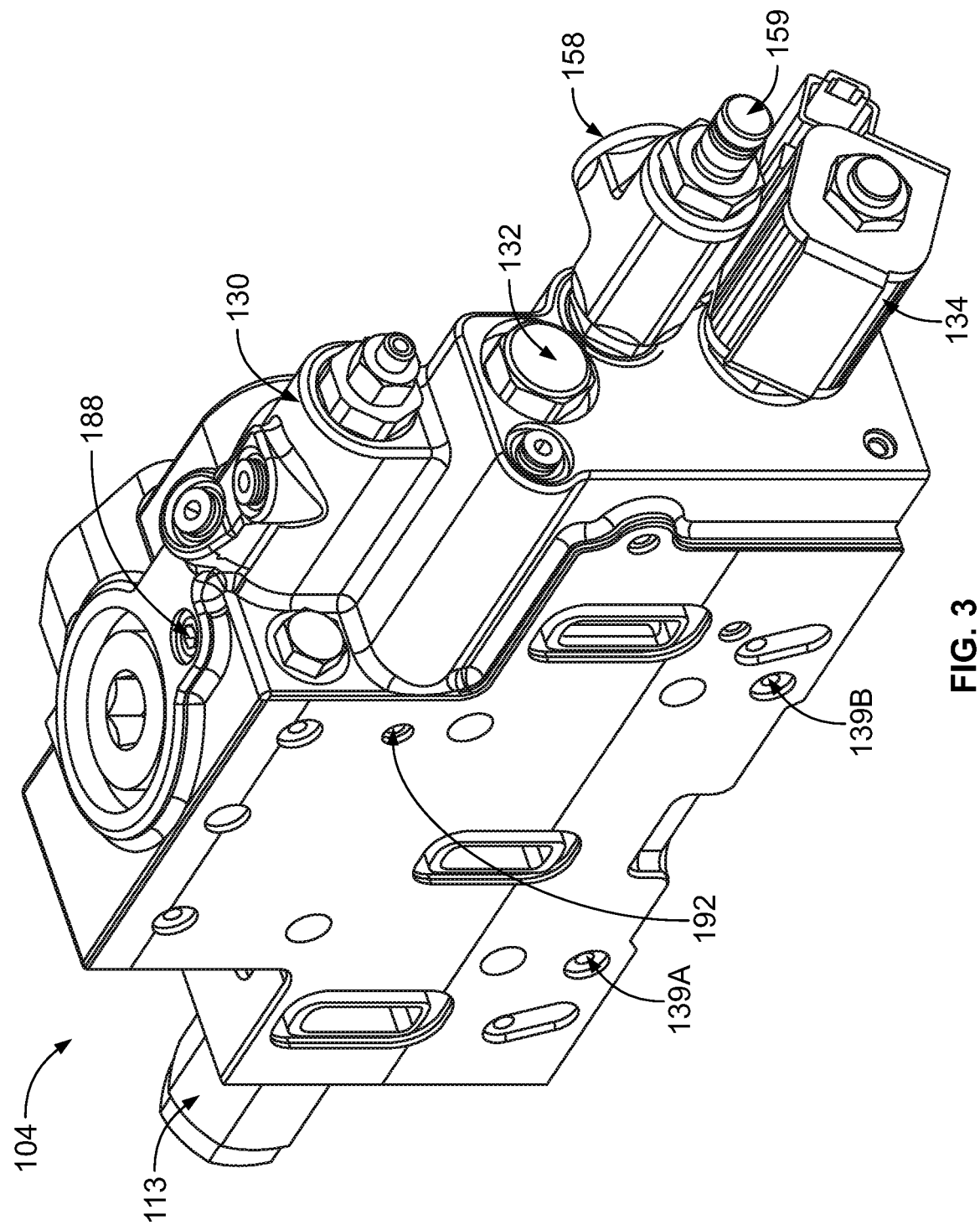
FIG. 3 illustrates a perspective view of an inlet section from an opposite perspective compared to FIG. 1, in accordance with an example implementation.
Figure 4:
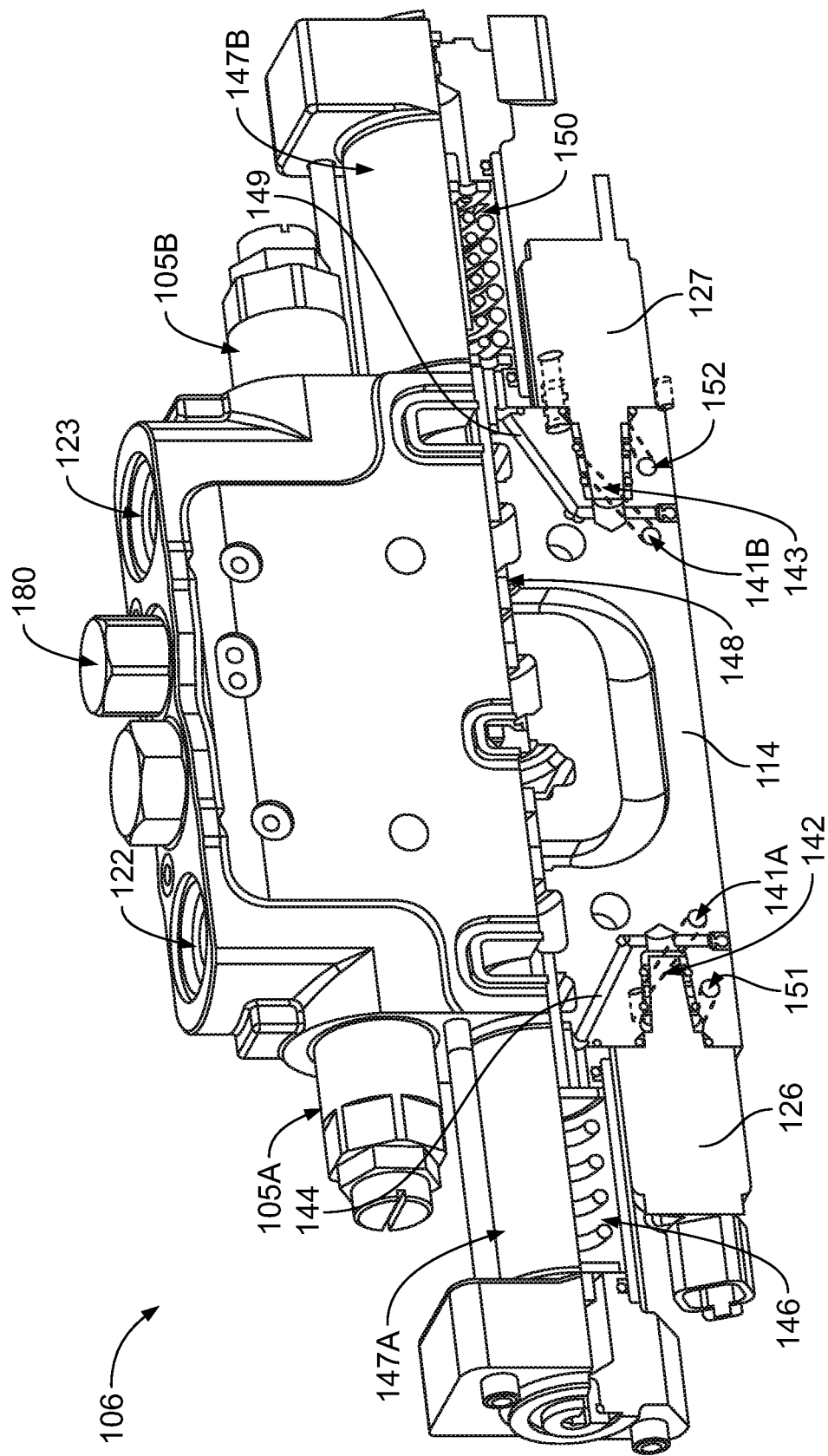
FIG. 4 illustrates a perspective view of a partial cross section of a worksection, in accordance with an example implementation.

FIG. 3 illustrates a perspective view of the inlet section 104 from an opposite perspective compared to FIG. 1, and FIG. 4 illustrates a perspective view of a partial cross section of the worksection 106, in accordance with an example implementation. Referring to FIGS. 2, 3, and 4 together, when the solenoid 135 is energized and the pilot-enable valve 134 operates in the pilot-enable state 138, the pilot-enable valve 134 enables communication of the pilot fluid signal to the worksections 106, 108. Particularly, the pilot fluid signal generated by the pressure reducing valve 130 flows through the check valve 132 and is then allowed to flow through the pilot-enable valve 134. The pilot fluid signal then flows through pilot fluid passage 140 (shown schematically in FIG. 2) formed of cross-drilled passages in the inlet section 104 and the worksections 106, 108 to provide the pilot fluid signal to the pilot valves 126-129.

For example, the inlet section 104 may include cross-drilled passages that communicate the pilot fluid signal to pilot openings 139A, 139B (shown in FIG. 3). The pilot openings 139A, 139B are aligned with corresponding pilot openings in the worksections 106, 108, such as pilot openings 141A, 141B of the worksection 106 (shown in FIG. 4), to form the pilot fluid passage 140 and enable the pilot fluid signal to traverse the valve assembly 100.

The pilot fluid passage 140 is further connected through cross-drilled passages in the worksections 106, 108 to the pilot valves 126-129. For example, the cross-drilled passages that connect the pilot fluid passage 140 to the pilot valve 126, 127 are shown schematically in FIGS. 2 and 4 as pilot fluid passages 142 and 143.

Referring to FIG. 4, if the pilot valve 126 is actuated, the pilot valve 126 reduces a pressure level of the pilot fluid signal (e.g., from 600 psi to a pressure level value between 200 psi and 460 psi proportional to an electric command signal to the pilot valve 126) and allows the pilot fluid signal to flow through passage 144 to end cap chamber 146 within end cap 147A. The pilot fluid then applies a force on spool 148 disposed in a spool bore in the valve section body 114 of the worksection 106 to move the spool 148 axially in a first direction (e.g., to the right in FIG. 4).

If the pilot valve 127 is actuated, the pilot valve 127 reduces a pressure level of the pilot fluid signal (e.g., from 600 psi to a pressure level value between 200 psi and 460 psi proportional to an electric command signal to the pilot valve 126) and allows the pilot fluid signal to flow through passage 149 to end cap chamber 150 within end cap 147B. The pilot fluid then applies a force on the spool 148 to move the spool 148 axially in a second direction (e.g., to the left in FIG. 4), opposite the first direction.

As illustrated in FIG. 4, the worksection 106 further includes drain openings 151, 152. The drain openings 151, 152 fluidly couple the pilot valves 126, 127, respectively, through cross-drilled passages in the valve assembly 100 to a drain passage 153 shown in FIG. 2. The drain passage 153 may operate as a dedicated drain connection for the pilot valves 126, 127. The drain passage 153 fluidly couples the pilot valves 126, 127 to a drain port 154 (shown in FIG. 2) that is separate from the tank port 118. As such, the drain passage 153 is separate from the tank flow passage 119, and is thus not exposed to elevated return flow pressure in the tank flow passage 119 and the tank 112. The worksection 108 can be configured with and pilot and drain openings similar to the worksection 106, and operation of the pilot valves 128, 129 can be configured to be similar to operation of the pilot valves 126, 127.

As mentioned above, when the pilot-enable valve 134 is unactuated (e.g., no electric signal is provided to the solenoid 135), the pilot-enable valve 134 operates in the pilot-disable state 136. As illustrated schematically in FIG. 2, when the pilot-enable valve 134 operates in the pilot-disable state 136, the pilot fluid signal generated by the pressure reducing valve 130 flows through the check valve 132, but is then blocked at port 155 of the pilot-enable valve 134. Further, in the pilot-disable state 136, the pilot-enable valve 134 fluidly couples the pilot fluid passage 140 to the drain passage 153, as schematically illustrated in FIG. 2 by connection 156 in the pilot-enable valve 134. Thus, when the pilot-enable valve 134 is unactuated and is in the pilot-disable state 136, the pilot fluid passage 140 is fluidly coupled through the connection 156 and the drain passage 153 to the drain port 154. As a result, no pilot fluid signal is provided to the pilot valves 126-129. In this state, the valve assembly 100 operates in a safety mode and the spools (e.g., the spool 148) of the worksections 106, 108 are not actuatable. As such, the pilot-enable valve 134 facilitates safe operation of the valve assembly 100. Particularly, the pilot-enable valve 134 enables shifting of the spools (e.g., the spool 148) in the worksections 106, 108 when the pilot-enable valve 134 is energized or actuated, but disables shifting of the spools when the pilot-enable valve 134 is de-energized or de-actuated.

In an example, the pressure reducing valve 130 may also operate as a pressure relief valve. In this example, the pressure reducing valve 130 may be configured to relieve any pressure spikes induced in the hydraulic passage 131, and may be referred to as a pressure reducing-relieving valve (PRRV).

Referring to FIG. 2, the pilot fluid signal generated by the pressure reducing valve 130 flows through the check valve 132 and is also provided through an accumulator passage 157 to an accumulator port 158 coupled to the valve assembly 100. The accumulator port 158 is also shown in FIG. 1. With this configuration, an accumulator (not shown) can be coupled to the valve assembly 100 at the accumulator port 158. Particularly, the accumulator could be mounted directly at the accumulator port 158 without having hydraulic hoses or lines extending from the valve assembly 100 to the accumulator. This way, reliability of the hydraulic system 101 can be enhanced and its cost can be reduced.

The accumulator can be configured with a charge pressure that enables the accumulator to maintain fluid at a pressure level that is slightly lower than the pressure level of the pilot fluid signal generated by the pressure reducing valve 130. For example, if the pressure level of the pilot fluid signal generated by the pressure reducing valve 130 is about 600 psi, the accumulator may be configured to maintain fluid therein at a pressure level of about 550 psi. This way, as long as the pressure reducing valve 130 maintains providing the pilot fluid signal at a higher pressure level compared to the fluid in the accumulator, the pressure reducing valve 130 provides the pilot fluid signal to the pilot-enable valve 134.

However, in examples, a malfunction may occur in the valve assembly 100 or the hydraulic system 101, and such malfunction might preclude the pressure reducing valve 130 from providing the pilot fluid signal to the pilot-enable valve 134. For example, the pump 102 or the pressure reducing valve 130 might malfunction, a hose might rupture, cavitation may occur in the accumulator passage 157, etc. In these examples, the accumulator could provide the pilot fluid signal through the accumulator passage 157 to the pilot-enable valve 134 to maintain operation of the valve assembly 100. This way, an operator can safely operate (e.g., lower a boom) the primary functions of the hydraulic machine controlled by the hydraulic system 101. The check valve 132 is configured to preclude fluid provided from the accumulator through the accumulator passage 157 from back-flowing to the pressure reducing valve 130. As such, the check valve 132 may be referred to as an accumulator check valve.

Further, as illustrated in FIGS. 1 and 2, the valve assembly 100 may include a diagnostic port 159 that taps or connects into the accumulator passage 157. With this configuration, a pressure sensor or measuring instrument may be coupled to the diagnostic port 159 to determine pressure level in the accumulator passage 157, which is also the pressure level of the pilot fluid signal provided to the pilot-enable valve 134.

Referring now to FIG. 2, movement of the spools (e.g., the spool 148 of the worksection 106 shown in FIG. 4) of the main control valves 120, 121 causes fluid to be directed to and from the workports 122-125, which may be fluidly connected to one or more associated hydraulic actuators or fluid receiving devices (e.g., cylinders, motors, etc.). For example, the workports 122, 123 of the worksection 106 can be fluidly coupled to a hydraulic actuator of a first primary function such as a bucket of a wheel loader, whereas the workports 124, 125 of the worksection 108 can be fluidly coupled to hydraulic actuator(s) of a second primary function such as a boom of the wheel loader.

Movement of a spool within a respective spool bore defines one or more variable area metering orifices that provide a metered flow across the spool depending upon the spool position. For example, each of the spools may have a plurality of annular grooves or axial notches that cooperate with internal surfaces of the valve section body 114, 115 to define a metering orifice. A position of the spool may be adjusted with respect to the valve section body 114, 115 to variably adjust the area of the metering orifices.

In examples, each of the worksections 106 and 108 can include a pressure compensator valve 180, 181, respectively, located downstream from the inlet flow passage 117 and downstream from the main control valves 120, 121. The pressure compensator valve 180, 181 is configured to maintain a predetermined pressure drop across a variable metering orifice formed when a respective spool (e.g., the spool 148) is moved axially regardless of the load experienced by an associated actuator. In examples, as shown in FIG. 2, the pressure compensator valve 180, 181 is located downstream from the variable metering orifice, and is therefore referred to as a post pressure-compensation (post-comp) flow sharing valve. However, other configurations, such as a pre pressure-compensation could also be used. In other examples, the valve assembly might not include pressure compensator valves.

FIG. 5 illustrates a perspective view of a cross section of the valve assembly 100, in accordance with an example implementation. The valve assembly 100 is configured as a load-sensing valve assembly that is configured to generate a load-sense pressure signal and provide the load-sense pressure signal to a valve load-sense passage 160 shown in FIGS. 2 and 5. Particularly, the worksection 106 has a load-sense check valve 162 configured to be fluidly coupled via passages 164 to one of the workports 122, 123 (i.e., the workport that has a higher pressure than the other) when the spool 148 of the worksection 106 is shifted in a given axial direction.

The load-sense check valve 162 has a check ball 165. If the pressure level of fluid in the passages 164 is higher than the pressure level of fluid in the valve load-sense passage 160, the check ball 165 is pushed upward and fluid is allowed to flow from the passages 164 to the valve load-sense passage 160. This way, pressure level in the valve load-sense passage 160 is substantially equal to the pressure level in the passages 164. However, if the pressure level of fluid in the valve load-sense passage 160 is higher than the pressure level of fluid in the passages 164, the check ball 165 is pushed downward and is seated to preclude flow of fluid between the passages 164 and the valve load-sense passage 160.

Similarly, the worksection 108 has a load-sense check valve 166 configured to be fluidly coupled via passages 168 to one of the workports 124, 125 (i.e., the workport that has a higher pressure than the other) when a spool 161 of the worksection 108 is shifted in a given axial direction.

The load-sense check valve 166 has a check ball 169. If the pressure level of fluid in the passages 168 is higher than the pressure level of fluid in the valve load-sense passage 160, the check ball 169 is pushed upward and fluid is allowed to flow from the passages 168 to the valve load-sense passage 160. This way, pressure level in the valve load-sense passage 160 is substantially equal to the pressure level in the passages 168. However, if the pressure level of fluid in the valve load-sense passage 160 is higher than the pressure level of fluid in the passages 168, the check ball 169 is pushed downward and is seated to preclude flow of fluid between the passages 168 and the valve load-sense passage 160.

With this configuration, a load-sense pressure signal having the highest pressure level in the of valve assembly 100 (e.g., the highest pressure level that the workports 122-125 of the worksections 106, 108 are subjected to) is communicated to the valve load-sense passage 160. Particularly, if the higher pressure level among the workports 122, 123 of the worksection 106 is higher than the pressure levels at the workports 124, 125 of the worksection 108, then a load-sense pressure signal having the higher pressure level of the worksection 106 is communicated from the passages 164 through the load-sense check valve 162 to the valve load-sense passage 160. Conversely, if the higher pressure level among the workports 124, 125 of the worksection 108 is higher than the pressure levels at the workports 122, 123 of the worksection 106, then a load-sense pressure signal having the higher pressure level of the worksection 108 is communicated from the passages 168 through the load-sense check valve 166 to the valve load-sense passage 160.

The valve load-sense passage 160 traverses the valve assembly 100, as shown in FIGS. 2 and 5 to the outlet section 110, and the load-sense pressure signal is communicated from the valve load-sense passage 160, through shuttle valve 170 and passage 172 to a valve load-sense port 174 disposed in the outlet section 110 and shown in FIG. 2. A pump load-sense hydraulic line 176 fluidly couples the valve load-sense port 174 to a pump load-sense port 178 of the pump 102.

The valve assembly 100 includes a load-sense relief valve 179 configured to protect the valve assembly 100 by relieving any high pressure levels induced in the passage 172 or the pump load-sense hydraulic line 176. Particularly, the load-sense relief valve 179 fluidly couples the passage 172 and the pump load-sense hydraulic line 176 to the tank flow passage 119 if pressure level in the passage 172 or the pump load-sense hydraulic line 176 exceeds a threshold value.

The pump 102 is a load-sensing source that is configured to receive the load-sense pressure signal having a pressure level (Ppls) at the pump load-sense port 178, and then add or subtract output fluid flow to cause the output fluid flow of the pump to have a pressure level (Ppout) that is equal to (Ppls) plus a margin pressure setting (Pm). In other words, pump output pressure (Ppout) minus (Ppls) is substantially equal to the margin pressure setting (Pm). The margin pressure setting (Pm) could, for example, be between 150 and 300 psi; however, other examples are possible. Thus, for example, if the (Ppls) is 2000 psi and (Pm) is 200 psi, then (Ppout) could be about 2200 psi.

As mentioned above, the load-sense check valve 162 is configured to be fluidly coupled to one of the workports 122, 123 of the worksection 106 when the spool 148 is shifted in a given axial direction. Similarly, the load-sense check valve 166 is configured to be fluidly coupled to one of the workports 124, 125 of the worksection 108 when the spool 161 is shifted in a given axial direction. However, when the primary functions are not actuated, i.e., when the spools 148, 161 are not shifted, the load-sense check valves 162, 166 are not connected to the workports 122-125.

Even if fluid having an elevated pressure is trapped in the valve load-sense passage 160 when the spools 148, 161 are no shifted, such pressure is vented through screen or filter 183, orifice 184, and passage 185 (shown in FIG. 2) to the tank flow passage 119, and thus pressure level in the valve load-sense passage 160 is reduced. Referring to FIG. 5, the filter 183 and the orifice 184 are placed in passage 186 disposed in the inlet section 104. Therefore no load-sense signal is provided to the valve load-sense passage 160 from the worksections 106, 108 when the primary functions are not actuated, i.e., when the spools 148, 161 are not shifted.

Thus, when the spools 148, 161 are not shifted (e.g., when the primary functions of the hydraulic machine are not actuated), no load-sense pressure signal is communicated from the worksections 106, 108 to the pump 102. If the pump 102 does not receive an elevated load-sense pressure signal from the valve load-sense passage 160, the pump 102 operates in a standby mode and is configured to output fluid having a pressure level substantially equal to or slightly higher than the margin pressure setting (Pm), e.g., 200 psi. As an example for illustration, the pressure level at the output of the pump 102 may amount to a value between 200 and 350 psi.

In examples, in addition to the primary functions (e.g., bucket, boom, etc.) of the hydraulic machine (e.g., wheel loader), the hydraulic machine may also include auxiliary or secondary functions such as a differential-lock function, a pin-disconnect function, clamp function, among other possible secondary functions. For example, the valve assembly 100 may have a secondary or auxiliary port 182 (shown in FIGS. 1 and 2) to which a hydraulic line may be connected to enable providing fluid flow from the valve assembly 100 to the secondary functions.

The secondary functions may be actuatable by hydraulic fluid having a particular pressure level. For example, the secondary functions may require an elevated pressure level such as 400-500 psi to be operated. Thus, fluid having a pressure level equal to the margin pressure setting (e.g., 200 psi) or slightly higher might not be sufficient to operate the secondary functions.

To enable the pump 102 to have a higher standby pressure level that is capable of operating the secondary functions, the valve assembly 100 is configured to provide the pump 102 with a load-sense pressure signal that is at least equal to the pressure level of the pilot fluid signal generated by the pressure reducing valve 130. This way, whether the primary functions of the valve assembly 100 and the spools 148, 161 of the worksections 106, 108 are actuated or not, the valve assembly 100 provides to the pump 102 a load-sense pressure signal having an elevated pressure level, thereby causing the pump 102 to provide fluid flow having a pressure level sufficient to operate the secondary functions.

In particular, referring to FIGS. 2 and 5, the valve assembly 100 includes a pilot check valve 188 that fluidly couples the pressure reducing valve 130 to the valve load-sense passage 160. Specifically, in addition to the pilot fluid signal being provided from the pressure reducing valve 130 through cross-drilled passages in the inlet section 104 to the pilot-enable valve 134, the pilot fluid signal is also provided through cross-drilled passages in the inlet section 104 from the pressure reducing valve 130 to a junction 190 shown in FIG. 5. While the pilot fluid signal communicated to the junction 190 is blocked at plug 192, the pilot fluid signal is allowed to flow to a first port 193 of the pilot check valve 188 through pilot fluid passage 194.

The pilot check valve 188 has a check ball 196. If the pressure level of pilot fluid signal in the pilot fluid passage 194 is higher than the pressure level of fluid in the valve load-sense passage 160, the check ball 196 is pushed upward and fluid is allowed to flow from the pilot fluid passage 194 around the check ball 196, through a second port 198 of the pilot check valve 188 to the valve load-sense passage 160. This way, pressure level in the valve load-sense passage 160 is made substantially equal to the pressure level in the pilot fluid passage 194. However, if the pressure level of fluid in the valve load-sense passage 160 is higher than the pressure level of fluid in the pilot fluid passage 194, the check ball 196 is pushed downward and is seated to preclude flow of fluid between the pilot fluid passage 194 and the valve load-sense passage 160.

In operation, if the valve load-sense passage 160 has fluid communicated through either the load-sense check valve 162 or the load-sense check valve 166, and such fluid has a higher pressure level than pressure level of the pilot fluid signal generated by the pressure reducing valve 130, the check ball 196 is pushed downward and is seated. The pilot check valve 188 thus remains closed and precludes flow of fluid from the pilot fluid passage 194 to the valve load-sense passage 160. In this case, the pilot fluid signal is not communicated to the valve load-sense passage 160, but rather the load-sense pressure signal from a workport of the workports 122-25 subjected to the highest load pressure in the valve assembly 100 is communicated to the pump 102.

However, in some examples, the primary functions controlled by the worksections 106 and 108 are not be actuated or the highest load pressure in the valve assembly 100 could be lower than the pressure level of the pilot fluid signal generated by the pressure reducing valve 130. In these examples, the load-sense check valves 162, 166 do not communicate to the valve load-sense passage 160 fluid having a pressure level higher than the pressure level of the pilot fluid signal generated by the pressure reducing valve 130. In other words, the pressure level of the pilot fluid signal generated by the pressure reducing valve 130 may be higher than the pressure level of fluid in the valve load-sense passage 160. As a result, in these examples, the pilot fluid signal generated by the pressure reducing valve 130 and communicated to the first port 193 pushes the check ball 196 upward and the pilot fluid signal is allowed to flow through the second port 198 to the valve load-sense passage 160. In these examples, the load-sense check valves 162, 166 are closed, i.e., the check balls 165 and 169 are seated. The pilot fluid signal is then communicated from the valve load-sense passage 160, through the shuttle valve 170 and the passage 172 to the valve load-sense port 174, then through the pump load-sense hydraulic line 176 to the pump load-sense port 178 of the pump 102. As such, the pump load-sense port 178 receives a load-sense pressure signal having a pressure level that that is at least equal to pressure level of the pilot fluid signal (e.g., 600 psi). The pump 102 then provides fluid flow output having a pressure level equal to the pressure level of the pilot fluid signal plus the margin pressure setting, and thus the fluid flow output has a pressure level that is sufficient to operate the secondary functions.

With this configuration, the valve assembly 100 is configured to use the pilot fluid signal as a substitute load-sense pressure signal to cause the pump 102 to provide a high pressure flow capable of driving auxiliary or secondary functions when a pressure level of the load-sense pressure signal from the primary functions is less than the pressure level of the pilot fluid signal. This way, even when the primary functions are not actuated and the pump 102 is in a standby mode, the pressure level of the output fluid of the pump 102 is sufficiently high because the pilot fluid signal is provided to the pump 102 as a load-sense pressure signal. As such, the pilot fluid signal provided to the pump 102 can be referred to as a standby load-sense pressure signal.

The implementation described above is an example implementation. Several variations could be implemented. For instance, two-seat shuttle valves could be used instead of the load-sense check valves 162, 166, and the pilot check valve 188). Further, rather than placing the pilot check valve 188 in the inlet section 104, it could be placed in any of the worksections 106, 108 or the outlet section 110. For instance, the pilot fluid signal can be routed through the valve assembly 100 to the outlet section 110, where it is compared to load-sense pressure signals of the worksections 106, 108 as described next.

Figure 6:
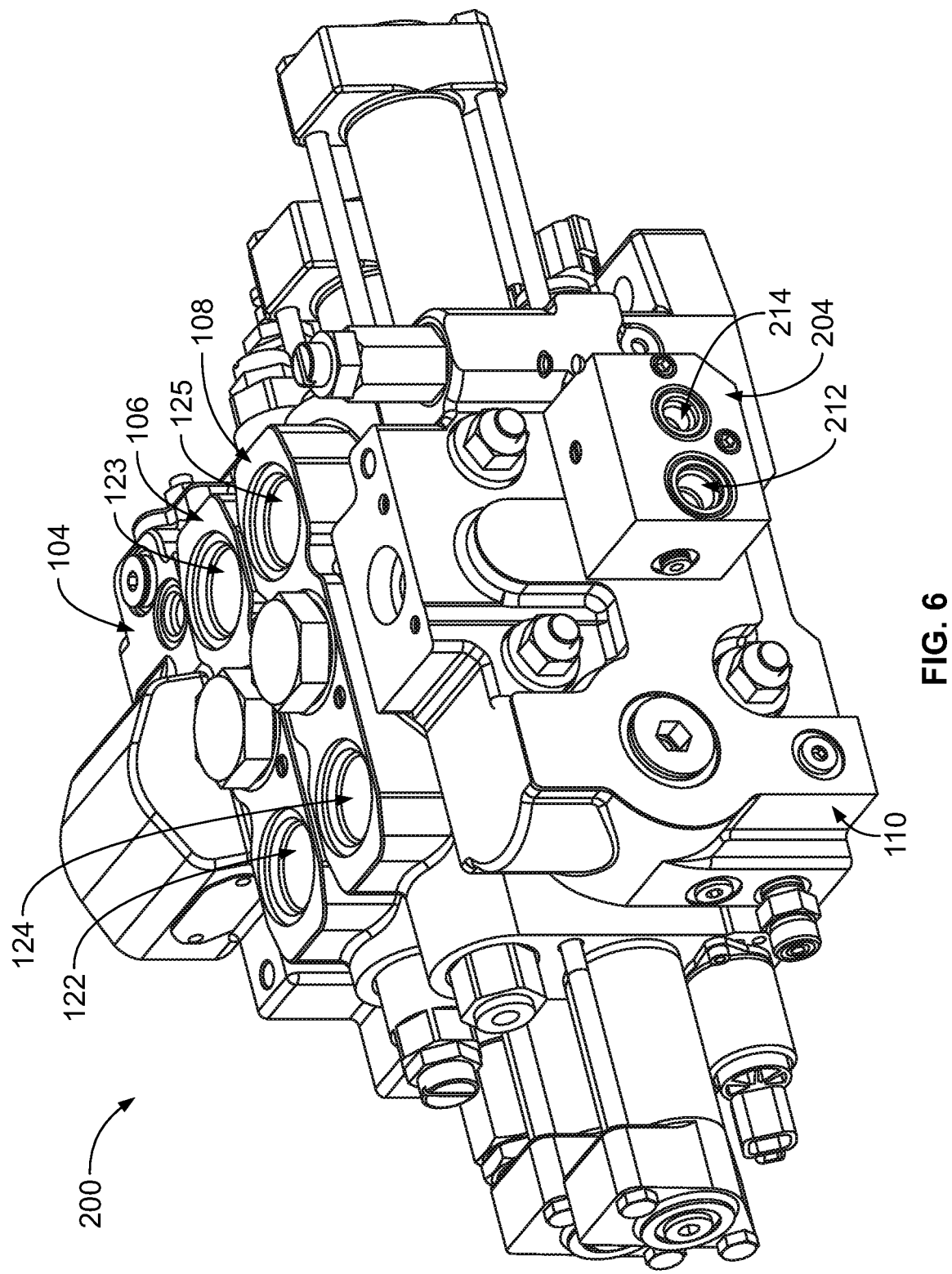
FIG. 6 illustrates a valve assembly, in accordance with an example implementation.
Figure 7:
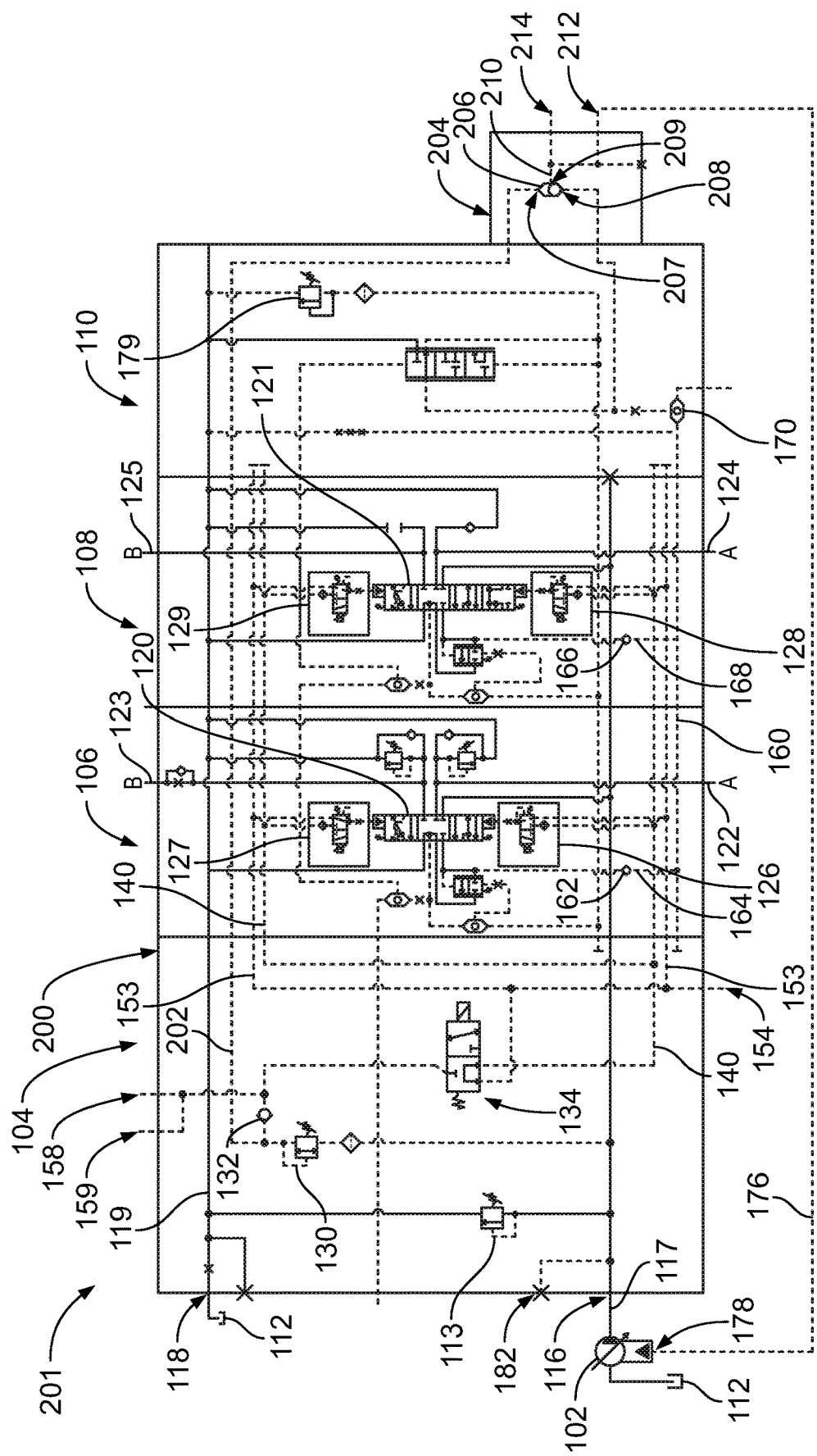
FIG. 7 illustrates a schematic of a hydraulic system that includes the valve assembly of FIG. 6, in accordance with an example implementation.

FIG. 6 illustrates a valve assembly 200, and FIG. 7 illustrates a schematic of a hydraulic system 201 that includes the valve assembly 200, in accordance with an example implementation. FIGS. 6 and 7 are described together. Similar components between the valve assembly 100 and the valve assembly 200 and between the hydraulic system 101 and the hydraulic system 201 are designated with the same reference numbers. The valve assembly 200 is shown in FIG. 6 from an opposite perspective view compared to the valve assembly shown in FIG. 1.

As shown in the implementation of FIGS. 6 and 7, the inlet section 104 does not have the pilot check valve 188 that fluidly couples the pressure reducing valve 130 to the valve load-sense passage 160. Rather, the pilot fluid signal generated by the pressure reducing valve 130 is communicated through a pilot signal passage 202 that traverses the valve assembly 200 to the outlet section 110. The valve assembly 200 includes a manifold or block 204 that is coupled or attached to the outlet section 110.

The block 204 includes a shuttle valve 206 that compares a first pressure level of the pilot fluid signal received through the pilot signal passage 202 to a second pressure level of fluid in the valve load-sense passage 160 and outputs a pressure signal having the higher of the two pressure levels. As an example, the shuttle valve 206 can have a valve body defining three ports: a port or inlet 207 fluidly coupled to the pilot signal passage 202, a port or inlet 208 fluidly coupled to the valve load-sense passage 160 (through the shuttle valve 170), and a port or outlet 209 fluidly coupled to passage 210. The shuttle valve 206 may have therein a valve element configured to move freely within the valve body of the shuttle valve 206. When pressure from a fluid is exerted through a particular inlet or port of the inlets 207, 208, it pushes the valve element towards the opposite inlet. This movement may block the opposite inlet, while allowing the fluid to flow from the particular inlet to the outlet 209. This way, two different fluid sources (e.g., the valve load-sense passage 160 and the pilot signal passage 202) can provide pressurized fluid to the outlet 209 without back flow from one source to the other.

The passage 210 is fluidly coupled to a valve load-sense port 212 (e.g., similar to the valve load-sense port 174). The pump load-sense hydraulic line 176 fluidly couples the valve load-sense port 212 to the pump load-sense port 178 of the pump 102. The block 204 may also include a load-sense diagnostic port 214. With this configuration, a pressure sensor or measuring instrument may be coupled to the load-sense diagnostic port 214 to determine pressure level of a load-sense pressure signal provided to the pump 102.

In other example implementations, the components of the block 204 can be integrated in the outlet section 110. In other words, the shuttle valve 206 and the valve load-sense port 212 can be disposed in the outlet section 110.

Other implementation variations could be made to the valve assemblies 100, 200 to compare the pilot pressure signal to the load-sense signal and outputting the signal having the higher pressure. As such, any type of valve or a combination of valves having a first port fluidly coupled to the pilot fluid signal and a second port coupled to the valve load-sense passage 160, and configured to provide the signal having the greater pressure to the pump load-sense port 178 could be used. The signal having the greater pressure then causes the pump 102 to provide fluid having a pressure level sufficient to drive secondary functions.

As such, the description above with respect to operation of the valve assembly 100, 200 can be applied to any valve assembly having: (i) an inlet section (e.g., the inlet section 104) configured to receive pressurized fluid from a load-sensing source of pressurized fluid (e.g., the pump 102); (ii) a load-sense port (e.g., the valve load-sense port 174) configured to be fluidly coupled to the load-sensing source (e.g., the pump 102) to provide a pressure signal to the load-sensing source, where pressure level of pressurized fluid of the load-sensing source is based on the pressure signal (e.g., output fluid of the pump 102 has a pressure level substantially equal to the pressure level of the pressure signal plus a margin pressure setting value); (iii) at least one worksection (e.g., the worksection 106, 108 configured to control fluid flow to and from an actuator, wherein the at least one worksection includes a body (e.g., the valve section body 114, 115) defining a bore and a spool (e.g., the spool 148, 161) axially movable in the bore; (iv) a load-sense passage (e.g., the valve load-sense passage 160) traversing the at least one worksection and configured to communicate a load-sense pressure signal having a first pressure level and representing a load-induced pressure of the actuator; (v) a plurality of pilot fluid passages (e.g., the pilot fluid passage, 140, the pilot fluid passages 142, 143) configured to communicate a pilot fluid signal having a second pressure level to the at least one worksection so as to move the spool in the bore; and (vi) a valve (e.g., the pilot check valve 188 or the shuttle valve 206) configured to: (a) receive the pilot fluid signal, and (b) in response to the second pressure level of the pilot fluid signal being higher than the first pressure level of the load-sense pressure signal, provide the pilot fluid signal to the load-sense port (e.g., the valve load-sense port 174) as the pressure signal to be provided to the load-sensing source (e.g., the pump 102).

Figure 8:
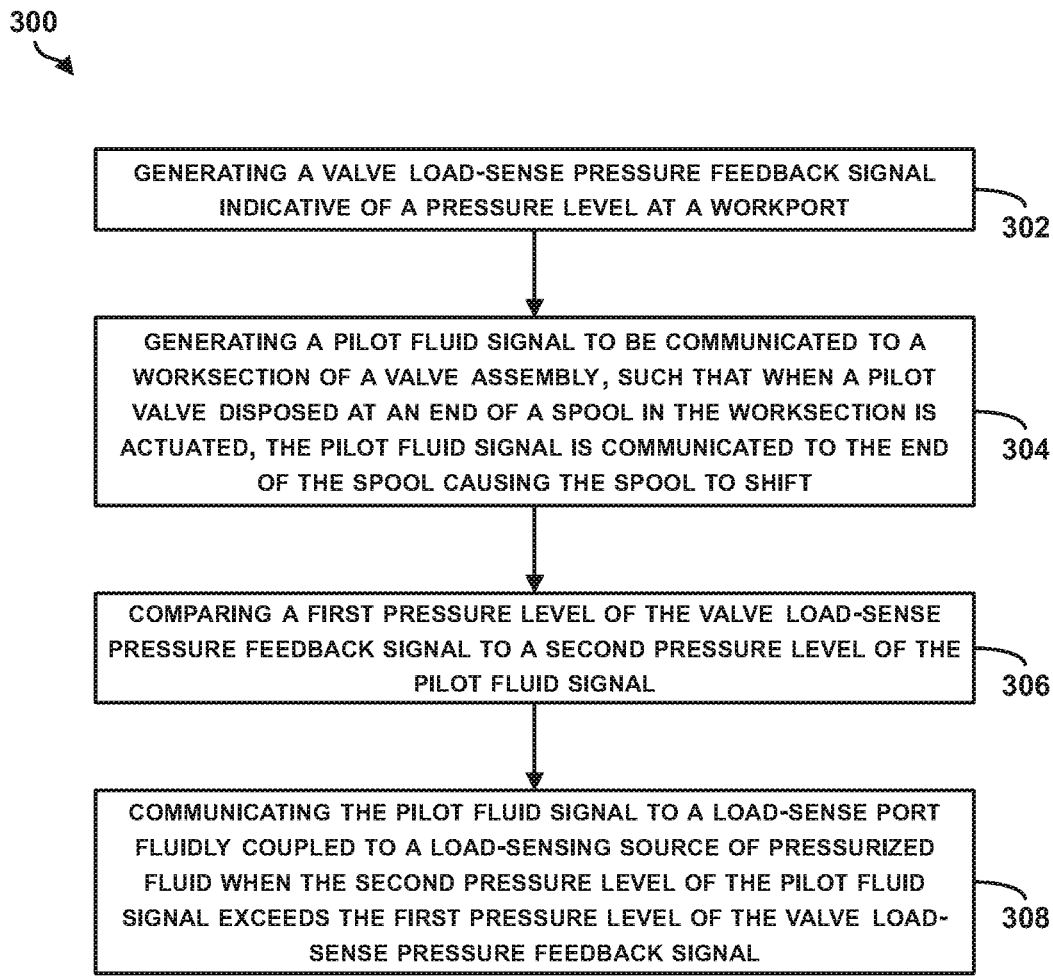
FIG. 8 is a flowchart of a method for using a pilot signal as a substitute load-sense signal, in accordance with an example implementation.

FIG. 8 is a flowchart of a method 300 for using a pilot signal as a substitute load-sense signal, in accordance with an example implementation. The method 300 shown in FIG. 8 presents an example of a method that could be used with the valve assembly 100 and the hydraulic system 101 or the valve assembly 200 and the hydraulic system 201 shown throughout the Figures, for example. The method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes generating a valve load-sense pressure signal indicative of a pressure level at a workport of an actuator. For example, the valve assembly 100 or 200 is configured to generate a load-sense pressure signal having the highest pressure level in the of valve assembly 100, 200 (e.g., the highest pressure level that the workports 122-125 of the worksections 106, 108 are subjected to). The load-sense pressure signal is communicated then to the valve load-sense passage 160.

At block 304, the method 300 includes generating a pilot fluid signal to be communicated to a worksection of a valve assembly, such that when a pilot valve disposed at an end of a spool in the worksection is actuated, the pilot fluid signal is communicated to the end of the spool causing the spool to shift. As described above, the pressure reducing valve 130 generates a pilot fluid signal that is communicated, when the pilot-enable valve 134 is actuated, to the end caps (e.g., the end caps 147A, 147B) of the worksections 106, 108. When a pilot valve (e.g., any of the pilot valves 126-129) is actuated, the pilot fluid signal is communicated to an end of the spool 148, 161, thereby causing the spool 148, 161 to shift.

At block 306, the method 300 includes comparing a first pressure level of the valve load-sense pressure signal to a second pressure level of the pilot fluid signal. The pilot check valve 188 or the shuttle valve 206 is subjected to the valve load-sense pressure signal at a first port and the pilot fluid signal at a second port, and is configured to compare the pressure levels of the two signals.

At block 308, the method 300 includes communicating the pilot fluid signal to a load-sense port fluidly coupled to a load-sensing source of pressurized fluid when the pressure level of the pilot fluid signal exceeds the pressure level of the valve load-sense pressure signal. The pilot check valve 188 or the shuttle valve 206 is configured to provide the pilot fluid signal to the pump load-sense hydraulic line 176. The pump 102 then provides fluid flow having a pressure level equal to the pressure level of the pilot fluid signal plus margin pressure setting.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve assembly comprising:
   an inlet section configured to receive pressurized fluid from a load-sensing pump;
   at least one worksection configured to control fluid flow to and from an actuator, wherein the at least one worksection includes a body defining a bore and a spool axially movable in the bore;
   a load-sense passage traversing the at least one worksection and configured to communicate a load-sense pressure signal having a first pressure level representing a load-induced pressure at the actuator;
   a plurality of pilot fluid passages configured to communicate a pilot fluid signal having a second pressure level to the at least one worksection so as to move the spool in the bore;
   a valve load-sense port configured to be fluidly coupled to the load-sensing pump to provide either the load-sense pressure signal or the pilot fluid signal as a pressure signal to the load-sensing pump, wherein the load-sensing pump is configured to provide pressurized fluid having a pressure level higher than a respective pressure level of the pressure signal;
   a valve configured to: (i) receive the pilot fluid signal, and (ii) in response to the second pressure level of the pilot fluid signal being higher than the first pressure level of the load-sense pressure signal, provide the pilot fluid signal to the valve load-sense port as the pressure signal to be provided to the load-sensing pump.

2. The valve assembly of claim 1, wherein the valve comprises a pilot check valve having a first port configured to receive the pilot fluid signal and a second port fluidly coupled to the load-sense passage, wherein the pilot check valve is configured to open and provide the pilot fluid signal to the load-sense passage in response to the second pressure level of the pilot fluid signal being higher than the first pressure level of the load-sense pressure signal, and wherein the load-sense passage is fluidly coupled to the valve load-sense port.

3. The valve assembly of claim 1, wherein the valve comprises a shuttle valve having: (i) a first inlet configured to receive the pilot fluid signal, (ii) a second inlet configured to receive the load-sense pressure signal, and (iii) an outlet fluidly coupled to the valve load-sense port, wherein the shuttle valve is configured to provide the pilot fluid signal to the outlet in response to the second pressure level of the pilot fluid signal being higher than the first pressure level of the load-sense pressure signal.

4. The valve assembly of claim 1, wherein the valve is disposed in the inlet section.

5. The valve assembly of claim 1, further comprising:
an outlet section disposed adjacent the at least one worksection, such that the at least one worksection is interposed between the inlet section and the outlet section, wherein the load-sense passage traverses the inlet section, the at least one worksection, and the outlet section, and wherein the valve load-sense port and the valve are disposed at the outlet section.

6. The valve assembly of claim 1, further comprising:
an inlet flow passage traversing the inlet section and the at least one worksection, wherein the inlet flow passage is configured to communicate pressurized fluid received from the load-sensing pump; and
a pressure reducing valve fluidly coupled to the inlet flow passage, and configured to receive pressurized fluid of the load-sensing pump and generate the pilot fluid signal having the second pressure level, wherein the second pressure level is less than the pressure level of pressurized fluid of the load-sensing pump.

7. The valve assembly of claim 6, wherein the valve is fluidly coupled to the pressure reducing valve so as to receive the pilot fluid signal generated by the pressure reducing valve.

8. The valve assembly of claim 7, wherein the valve fluidly couples the pressure reducing valve to the load-sense passage and is configured to provide the pilot fluid signal to the load-sense passage in response to the second pressure level of the pilot fluid signal being higher than the first pressure level of the load-sense pressure signal.

9. The valve assembly of claim 1, further comprising:
a pilot-enable valve fluidly coupled to a pilot fluid passage of the plurality of pilot fluid passages, wherein:
when the pilot-enable valve is actuated, the pilot-enable valve fluidly couples the pilot fluid signal to the at least one worksection to enable actuation of the spool, and
when the pilot-enable valve is unactuated, the pilot-enable valve blocks the pilot fluid signal to disable actuation of the spool.

10. The valve assembly of claim 1, further comprising:
a first pilot valve disposed at a first end of the spool; and
a second pilot valve disposed at a second end of the spool opposite the first end, wherein when a pilot valve of the first pilot valve and second pilot valve is activated, the pilot valve enables communication of the pilot fluid signal to a respective end of the spool causing the spool to move in the bore from in a respective axial direction.

11. The valve assembly of claim 10, wherein when the pilot valve is activated, the pilot valve is configured to reduce pressure level of the pilot fluid signal from the second pressure level to a third pressure level prior to communicating the pilot fluid signal to the respective end of the spool.

12. The valve assembly of claim 1, wherein the inlet section comprises:
an inlet port configured to be fluidly coupled to the load-sensing pump of pressurized fluid to receive pressurized fluid therefrom, and
a tank port configured to be fluidly coupled to a tank to provide fluid flow returning from the at least one worksection to the tank, wherein the inlet port and the tank port are vertically-stacked in different planes.

13. A hydraulic system comprising:
a load-sensing pump having a pump load-sense port configured to receive a pressure signal, wherein the load-sensing pump is configured to generate pressurized fluid having a pressure level based on the pressure signal;
an actuator; and
a valve assembly configured to control fluid flow from the load-sensing pump to the actuator, the valve assembly comprising:
an inlet section configured to receive pressurized fluid from the load-sensing pump,
a valve load-sense port configured to be fluidly coupled to the pump load-sense port to provide the pressure signal to the load-sensing pump,
at least one worksection comprising: (i) a body defining a bore, and (ii) a spool axially movable in the bore to control fluid flow to and from the actuator,
a load-sense passage traversing the at least one worksection and configured to communicate a load-sense pressure signal having a first pressure level and representing a load-induced pressure of the actuator,
a plurality of pilot fluid passages configured to communicate a pilot fluid signal having a second pressure level to the at least one worksection so as to move the spool in the bore, and
a valve configured to: (i) receive the pilot fluid signal, and (ii) in response to the second pressure level of the pilot fluid signal being higher than the first pressure level of the load-sense pressure signal, provide the pilot fluid signal to the valve load-sense port to be communicated to the pump load-sense port as the pressure signal.

14. The hydraulic system of claim 13, wherein the valve comprises a pilot check valve having a first port configured to receive the pilot fluid signal and a second port fluidly coupled to the load-sense passage, wherein the pilot check valve is configured to open and provide the pilot fluid signal to the load-sense passage in response to the second pressure level of the pilot fluid signal being higher than the first pressure level of the load-sense pressure signal, and wherein the load-sense passage is fluidly coupled to the valve load-sense port.

15. The hydraulic system of claim 13, wherein the valve comprises a shuttle valve having: (i) a first inlet configured to receive the pilot fluid signal, (ii) a second inlet configured to receive the load-sense pressure signal, and (iii) an outlet fluidly coupled to the valve load-sense port, wherein the shuttle valve is configured to provide the pilot fluid signal to the outlet in response to the second pressure level of the pilot fluid signal being higher than the first pressure level of the load-sense pressure signal.

16. The hydraulic system of claim 13, wherein the valve assembly further comprises:
an inlet flow passage traversing the inlet section and the at least one worksection, wherein the inlet flow passage is configured to communicate pressurized fluid received from the load-sensing pump; and
a pressure reducing valve fluidly coupled to the inlet flow passage, and configured to receive pressurized fluid of the load-sensing pump and generate the pilot fluid signal having the second pressure level, wherein the second pressure level is less than the pressure level of pressurized fluid generated by the load-sensing pump.

17. The hydraulic system of claim 16, wherein the valve is fluidly coupled to the pressure reducing valve so as to receive the pilot fluid signal generated by the pressure reducing valve, and wherein the valve fluidly couples the pressure reducing valve to the load-sense passage and is configured to provide the pilot fluid signal to the load-sense passage in response to the second pressure level of the pilot fluid signal being higher than the first pressure level of the load-sense pressure signal.

18. The hydraulic system of claim 16, wherein the valve assembly further comprises:
a pilot-enable valve fluidly coupled to the pressure reducing valve, wherein:
when the pilot-enable valve is actuated, the pilot-enable valve fluidly couples the pilot fluid signal generated by the pressure reducing valve to the at least one worksection to enable actuation of the spool, and
when the pilot-enable valve is unactuated, the pilot-enable valve blocks the pilot fluid signal to disable actuation of the spool.

19. A method comprising:
generating a valve load-sense pressure signal indicative of a pressure level at a workport of an actuator;
generating a pilot fluid signal to be communicated to a worksection of a valve assembly, such that when a pilot valve disposed at an end of a spool in the worksection is actuated, the pilot fluid signal is communicated to the end of the spool causing the spool to shift;
comparing a first pressure level of the valve load-sense pressure signal to a second pressure level of the pilot fluid signal; and
communicating the pilot fluid signal to a valve load-sense port fluidly coupled to a load-sensing pump of pressurized fluid when the second pressure level of the pilot fluid signal exceeds the first pressure level of the valve load-sense pressure signal, such that the load-sensing pump provides pressurized fluid having pressure level higher than the second pressure level.

20. The method of claim 19, further comprising:
actuating a pilot-enable valve disposed in the valve assembly so as to enable communication of the pilot fluid signal to the worksection.

* * * * *